July 12, 1927.

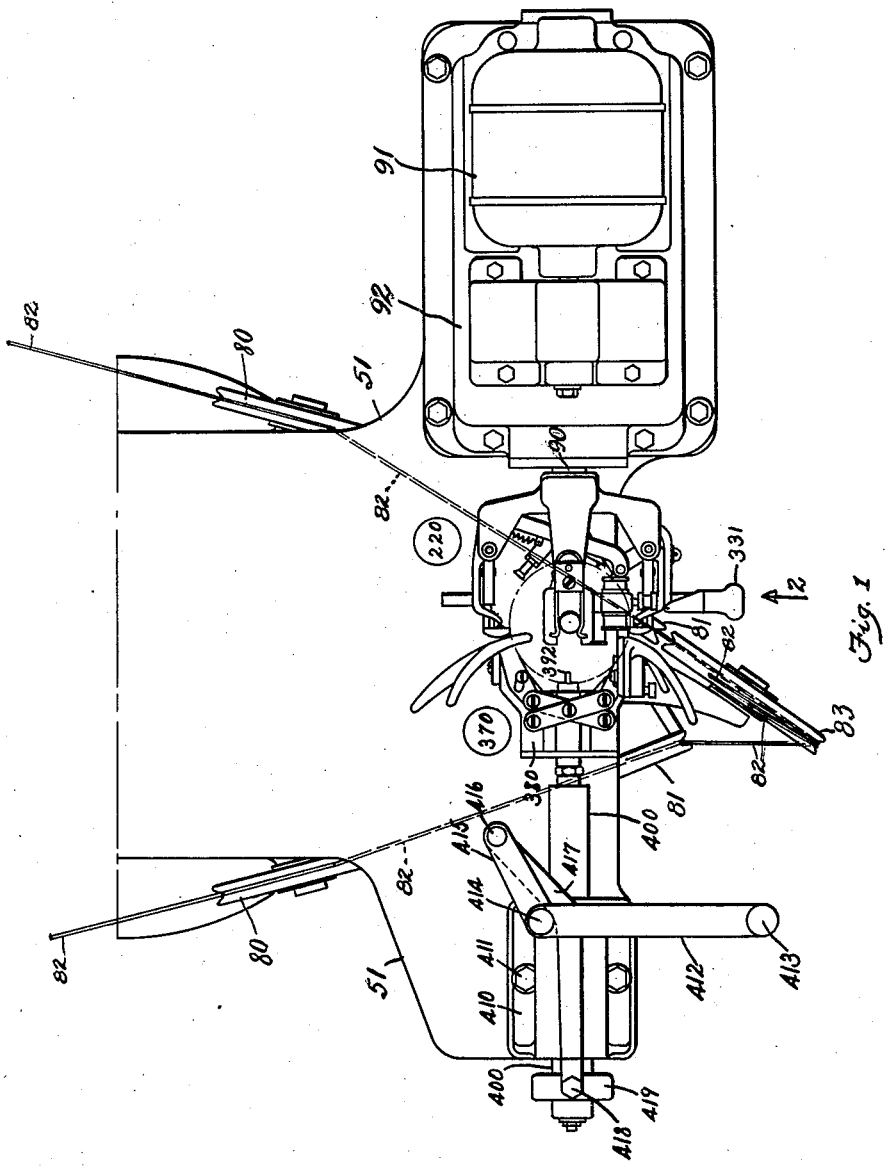

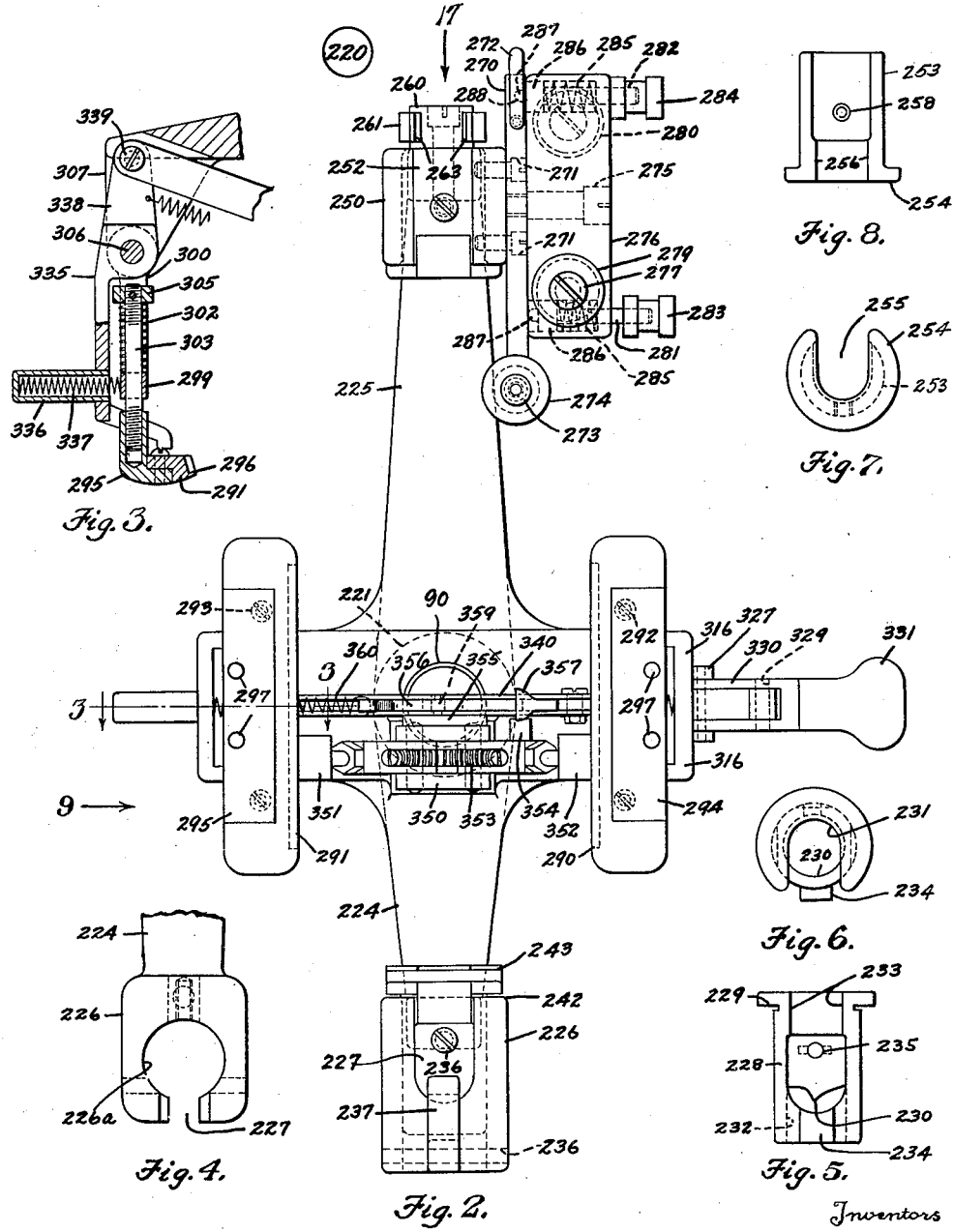

R. G. JONES ET AL 1,635,677

ARMATURE WINDING MACHINE

Filed Jan. 23, 1925    8 Sheets-Sheet 3

Inventors
Russell G. Jones
and Carl Zwiebel
By Spencer Sewall and Hardman
their Attorneys July 12, 1927.  R. G. JONES ET AL  1,635,677

ARMATURE WINDING MACHINE

Filed Jan. 23, 1925  3 Sheets-Sheet 4

Inventors
Russell G. Jones
and Carl Zwiebel
By Spencer Duvall and Hardman
their Attorneys July 12, 1927.
R. G. JONES ET AL
1,635,677
ARMATURE WINDING MACHINE
Filed Jan. 23, 1925
8 Sheets-Sheet 5
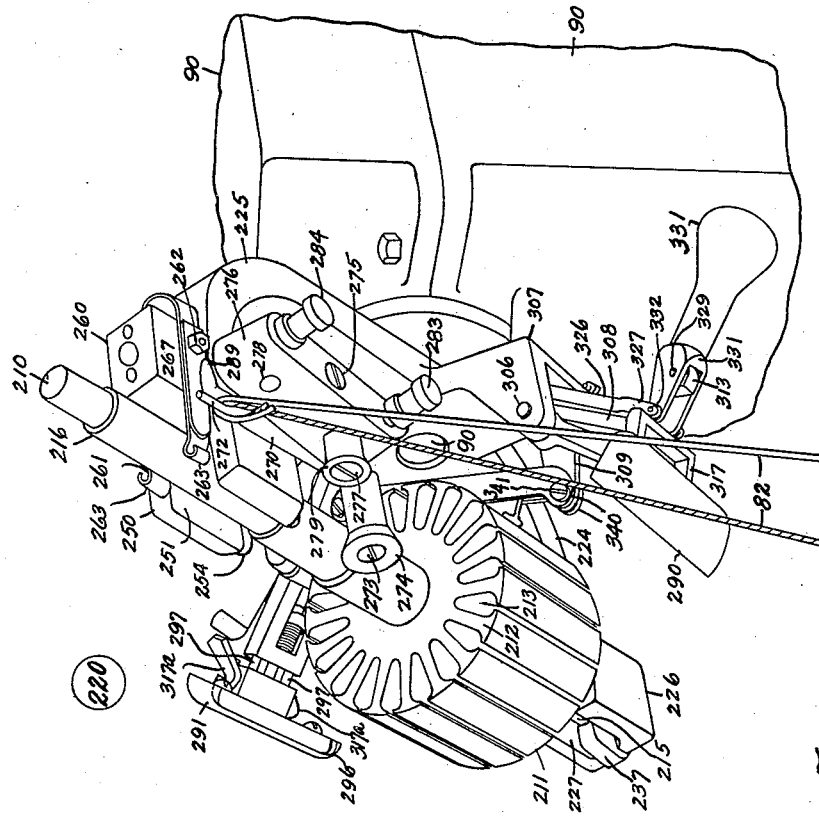
Fig. 21.
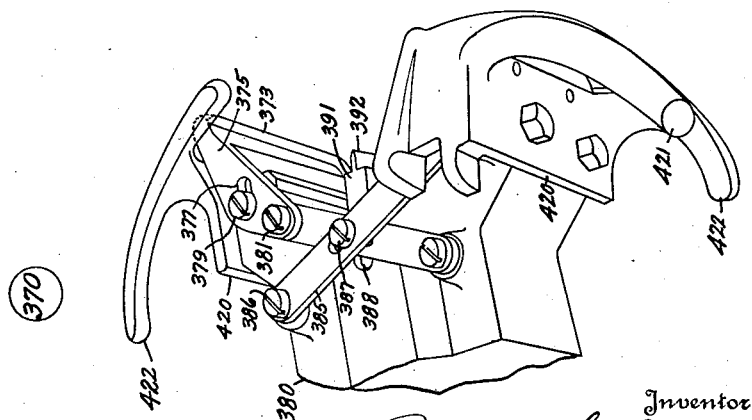
Inventors
Russell G. Jones
and Carl Zwiebel
By Spencer Sewall and Hardman
their Attorneys July 12, 1927.

R. G. JONES ET AL

ARMATURE WINDING MACHINE

Filed Jan. 23, 1925

Inventors
Russell G. Jones
and Carl Zwiebel
By Spencer Small and Hardman
their Attorneys Patented July 12, 1927.

1,635,677

UNITED STATES PATENT OFFICE.

RUSSELL G. JONES, OF LONDON, ENGLAND, AND CARL ZWIEBEL, OF DAYTON, OHIO, ASSIGNORS, BY MESNE ASSIGNMENTS, TO DELCO-REMY CORPORATION, OF DAYTON, OHIO, A CORPORATION OF DELAWARE.

ARMATURE-WINDING MACHINE.

Application filed January 23, 1925. Serial No. 4,342.

This invention relates to apparatus for winding the armatures of dynamo-electric machines. This type of machine includes a power-driven winding fixture adapted to receive an open-slotted armature core. One or more flexible wires are attached to the winding fixture and these wires are unwound from supply reels by the rotation of the winding fixture which also includes means for guiding the wires into armature core slots having predetermined spacing.

One of the objects of the present invention is to guide the wire into the core slots in a manner least damaging to the insulation of the wire, and such that the space in the core slots will be used to good advantage so that more conductors may be placed in a core slot than heretofore possible.

Another object of the present invention is to provide a winding fixture with improved means for facilitating the formation of loops between successive armature coils, the loops being afterward cut to form armature leads.

A further object is to provide improved means for indexing the armature core into successive positions for receiving the armature coils.

Further objects and advantages of the present invention will be apparent from the following description, reference being had to the accompanying drawings, wherein a preferred form of the present invention is clearly shown.

In the drawings:

Fig. 1 is a plan view of a winding machine embodying the present invention;

Fig. 2 is a view looking in the direction of the arrow 2 in Fig. 1, showing the driving portion of the winding fixture;

Fig. 3 is a sectional view on the line 3—3 of Fig. 2;

Fig. 4 is a fragmentary plan view of a bracket for supporting one end of the armature shaft;

Figs. 5 and 6 are, respectively, front and top views of a bushing for receiving one end of the armature shaft;

Figs. 7 and 8 are, respectively, bottom and front views of a bushing for receiving the other end of the armature shaft;

Fig. 21 is a perspective view showing the driving portion of the winding fixture supporting an unwound armature core from driven portion of the fixture retracted from the armature core;

Figure 10:
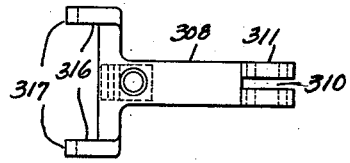
Figs. 10 and 11 are side and plan views, respectively, of a wire guide clamp actuating arm.
Figure 11:
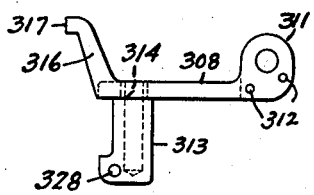

Driving winding fixture.

Referring to Fig. 21, the armature to be wound includes a shaft 210 extending through a laminated core 211 having core teeth 212 spaced by slots 213. The shaft 210 is supported for rotation about an axis at right angles to its axis by winding fixture 220 mounted upon the left end of the shaft 90, which is driven by an electric motor 91 through mechanism enclosed by a housing 92. This mechanism is described and claimed in a copending application, Serial No. 183,019, filed April 11, 1927, and includes means for automatically stopping the shaft 90 after a predetermined number of rotations. This fixture 220 and the armature cooperate with a wire-guiding fixture 370 which is supported for rotation about an axis in alignment with the axis of shaft 90. The fixture 220 will hereafter be termed the driving fixture, since it positively rotates the armature core, and the fixture 370 will be known as the driven fixture since it is driven by the fixture 220 in the core 211. The driving fixture 220 will now be described with reference to Figs. 2 to 13, inclusive.

The functions of the driving fixture 220 are to support the armature shaft and core in a manner such that the shaft may be quickly inserted in and removed from the fixture; to index quickly and accurately the core in its successive positions; and to provide wire-guiding clamps which extend slightly into certain spaced slots of the armature core in order to guide the wire therein while preventing contact of the wire with the edges of the core teeth. The clamps and the indexing device are operated by a single handle. The fixture 220 also carries means for forming loops in the wire between successive armature core winding operations.

*Driving fixture—support of armature shaft.*

Figure 9:
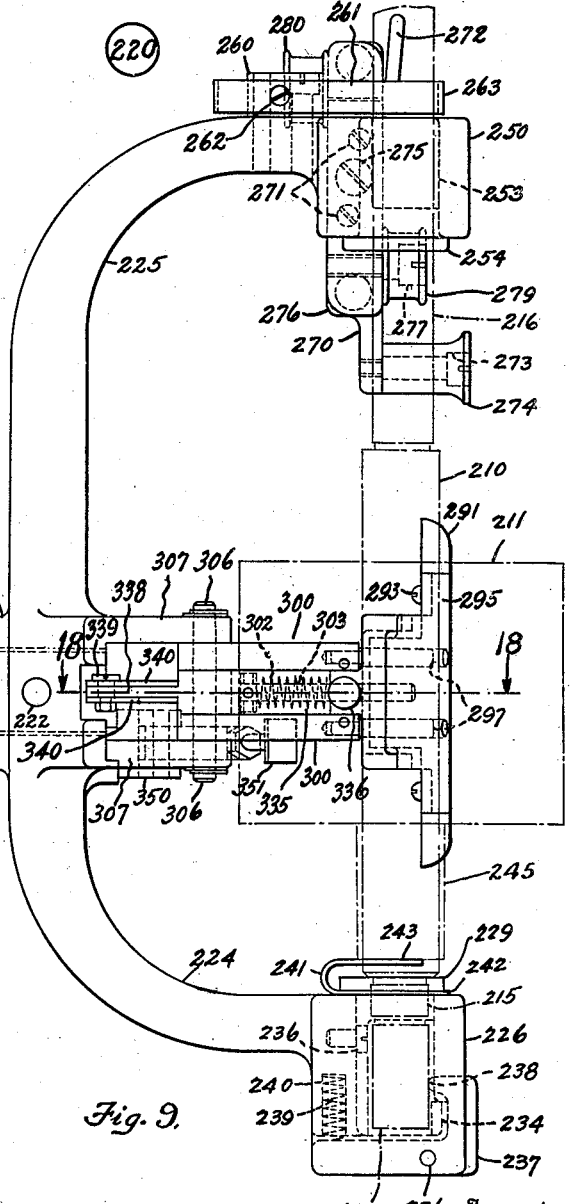
Fig. 9 is a side view of the apparatus shown in Fig. 2 looking in the direction of the arrow 9.

In order to support the ends of the armature shaft 210 the fixture 220 includes a hub 221 which is attached to the shaft 90 by a pin which passes through holes 222 in the hub and hole 223 in the end of the shaft 90. From opposite sides of the hub there extend two shaft-supporting brackets 224 and 225. The bracket 224 includes a boss 226 provided with an aperture 226ª at right angles to the shaft 90. The boss 226 is provided with an opening 227 extending through one wall of the boss into the aperture 226ª. The opening 226ª receives a bushing 228 having a flange 229. The bushing 228 includes a notch 230 leading into the central bore 231 of the bushing. The central bore 231 includes a porion 232 which is larger in diameter than the end portion 214 of the shaft 210, and includes an accurately-machined surface 233 which is adapted to fit closely about the shaft portion 215 as shown in Fig. 9. The bushing 228 includes a lug 234 which is received by the narrower portion of the notch 227 of the boss 226, in order to assist in locating the bushing 228. Bushing 228 is provided with a hole 235 which receives the head of a screw 236 threadedly engaging the boss 225. Boss 226 carries a pin 236 providing a bearing for a bell-crank lever 237 having a finger 238 which projects through the notch 227 of the boss 226 and through the notch 230 in the bushing 228 for the purpose of engaging the end 214 of the shaft 210. The finger 238 is yieldingly pressed against the shaft end 214 by a spring 239 carried within the recess 240 in the boss 225 and bearing against one end of the lever 237. A U-shaped spring 241 is provided with notched branches 242 and 243, and the branch 242 is located between the bushing flange 229 and the boss 226. The spring 241 supports a tube of insulation 245 indicated by dot-and-dash lines in Fig. 9.

The bracket 225 carries a boss 250 having an opening 251 in alignment with the opening 226ª of the boss 226, and having a notch 252 extending through one wall of the boss 251. The opening 251 receives a bushing 253 having a flange 254 which is located against the boss 250 and is provided with a notch 255 including a finished cylindrical surface 256 for engaging the upper end 216 of the shaft 210 and having a cylindrical surface 257 slightly larger in diameter than the shaft 216. The bushing 253 is provided with a hole 258 for receiving the head of a screw (not shown), it being understood that the bushing 253 is retained by a screw similar to screw 236 which retains the bushing 228.

To the bracket 225 is secured a block 260 to which a U-shaped spring having branches 261 is secured by screws 262. The ends of the branches are normally spaced at a distance less than the diameter of th; shaft end 216 and are provided with curved portions 263 to facilitate entering the sha"t end 216 between the branches 261.

*Driving fixture—loop former.*

In order to provide for forming loops between successive armature coil winding operations, the driving fixture 220 carries a stationary guide wheel bracket 270 which is attached to the boss 250 by screws 271. The bracket 270 is provided with a hook 272 for receiving the ends of the wires 82, as shown in Figs. 2, 9 and 21. Two wires 82 are wound upon the armature core at the same time. These wires are pulled from two supply reels of wire not shown, and are guided by pulleys 80, 80 and 81, 81 to a pulley 83 from which the wires pass to the hook 272 at the beginning of an armature winding operation. Bracket 270 supports a screw 273 providing a bearing for a guide wheel 274. Bracket 270 supports a screw 275 providing a bearing for a shiftable guide wheel bracket 276. Bracket 276 carries screws 277 and 278 providing bearings for shiftable guide wheels 279 and 280, respectively. The bracket 276 carries spring-pressed plungers 281 and 282 provided with handles 283 and 284, respectively. Each plunger is yieldingly urged toward the bracket 270 by a spring 285 bearing against the bracket 276 and against shoulder 286 provided on each plunger. Each plunger is provided with a rounded end 287, and the bracket 270 is provided with a recess 288 for receiving either of the plungers 281 or 282, when that plunger is moved in alignment with the recess 288. The bracket 270 is beveled at 289 so that, as the bracket 276 is moving counter-clockwise, the plunger end 287 will be cammed over the surface of the bracket 270 and then will be spring-pressed into the recess 288.

Driving fixture—wire guiding clamps.

The driving fixture 220 includes two wire-guiding clamps 290 and 291 secured by screws 292 and 293, respectively, to clamp supports 294 and 295 respectively. Each jaw is provided with a thin-edged flange 296 adapted to engage one side edge and both end edges of a core tooth, as shown clearly in Fig. 17. Each of the jaw supports 294 and 295 are slidable upon two pins 297 having reduced ends received by holes 298 provided in the yoke 299 of a clamp-supporting lever 300. The pins 297 are retained by pins which are driven through holes 301 provided in the lever 300. Each of the clamps 290 and 291 are yieldingly urged toward their respective supporting levers 300 by a spring 302 which encircles a rod 303 which passes through a hole 304 in the clamp lever 300, which is attached at one end to a clamp support, and at the other end to a collar 305. As shown in Fig. 3, the spring 302 is located between the lever yoke 299 and the collar 305 so that the clamp 291 is yieldingly urged toward the lever 300. Each clamp-supporting lever is pivotally mounted on a rod 306 carried by a bifurcated bracket 307 which is formed integrally with the hub 221 of the fixture 220. The clamp 290 is actuated by an operating lever 308 pivoted upon the rod 306 and provided with a lever arm 309 which is received by a notch 310 in the hub 311 of lever 308 (see Fig. 10). The lever arm 309 is attached to the hub 311 by pins which pass through holes 312 in the lever hub 311. Lever 308 is provided with a spring-socket extension 313 which is provided with a recess 314 for receiving a spring 315 which bears against the supporting lever 300 of the clamp 290. Lever 308 includes branches 316 which have fingers 317 for engaging lugs 318 provided by the clamp support 294.

Figure 12:
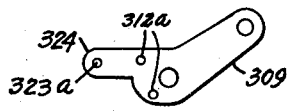
Fig. 12 is a plan view of a lever extension for one of the wire guide clamp actuating arms.
Figure 13:
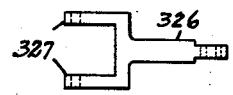
Fig. 13 is a side view of the wire guide clamp latch yoke.
Figure 15:
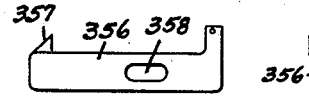
Figs. 14 and 15 are plan and end views, respectively, of the armature core indexing bar.
Figure 14:
Figure 16:
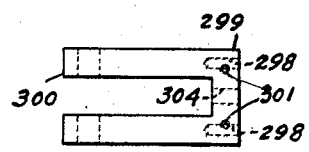
Fig. 16 is a side view of one of the wire guide supporting arms.
Figures 17, 18:
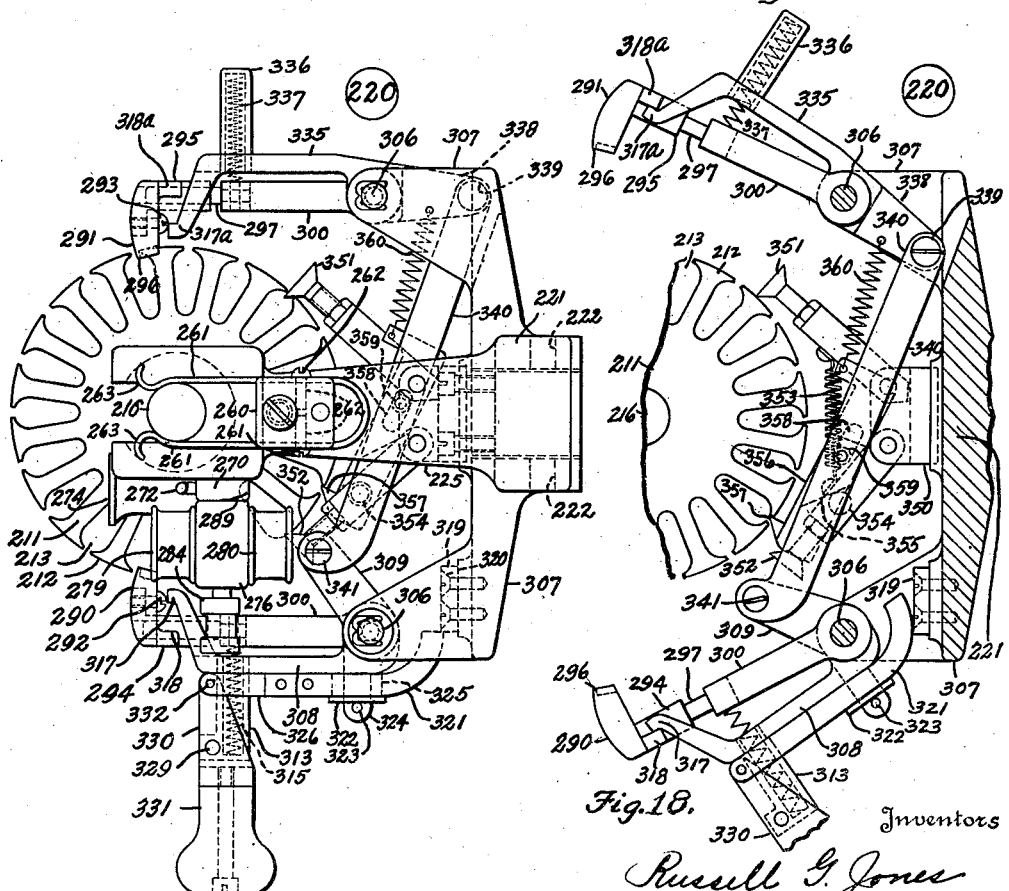
Fig. 17 is a plan view of the apparatus shown in Fig. 2, looking in the direction of the arrow 17.
Fig. 18 is a view similar to Fig. 17, showing certain parts in other positions, this view being partly in section on the line 18—18 of Fig. 9.

In order to latch the clamp-operating lever 308 in the position shown in Fig. 17, there are provided a latch block 319 attached by screws 320 to the bracket 307, and a latch slide 321 which is retained in position against the outside face of the lever 308 by means of a washer 322 which is retained by a pin 323 passing through hole 323ª in the extension 324 of the lever arm 309 (see Fig. 12). The latch slide 321 is provided with a notch 325 through which the lever extension 324 projects. The latch slide 321 is attached to the shank 326 of a fork 327 which forms an extension for the slide 321 and embraces the spring-socket extension 313 of the lever 308. Extension 313 is provided with a hole 328 (see Fig. 11) for receiving a pin 329 providing a bearing for a bifurcated operating-lever 330 carrying a handle 331 and connected at 332 with the fork branches 327.

Clamp 291 is actuated by an operating lever 335 carrying a spring-socket extension 336 which receives a spring 337 for engaging the clamp-support lever 300 which supports the clamp 291. Lever 335 is provided with fingers 317ª for engaging lugs 318ª constructed similarly to the parts 317 and 318, respectively, of the clamp-actuating lever 308 and the clamp support 294. Lever 335 includes a lever arm 338 connected by a bolt 339 with two flat links 340 which extend in spaced relation between the brackets 307 and are connected by a bolt 341 with the lever 309. It is apparent that the manipulation of the handle 331 operates both clamp-supporting levers 300.

Driving fixture—core indexing device.

The mechanism provided by the driving fixture 220 and actuated by the handle 331 for indexing the armature core in its various positions for winding, includes a bracket 350 attached to the fixture hub 221. Bracket 350 pivotally supports two locating pawls 351 and 352, which are connected by a spring 353 tending to urge the pawls 351 and 352 toward the armature core 211. Pawl 351 tends to prevent clockwise rotation of the core 211, as viewed in Fig. 18, and the pawl 352, counterclockwise rotation of the core 211. Pawl 352 carries a roller 354 which is engaged by a cam 355 supported by the links 340. When the links 340 are in the position shown in Fig. 18, the pawl 352 will be held out of engagement with the core 211, so that the core may be rotated in a counterclockwise direction. The member which engages the core 211 to move it counterclockwise is the indexing bar 356, having a pointed projection 357 adapted to enter into a tooth-space 213 and engage a core tooth 212. The bar 356 is located in the space between the parallel links 340 and is provided with an elongated opening 358 for receiving a roller 359 attached to and located between the links 340. A spring 360 which connects the lever arm 338 with the indexing bar 356 tends to urge the pointed projection 357 against one of the core teeth 212. Movement by the handle 331 of the clamps 290 and 291 from the position shown in Fig. 18 to that shown in Fig. 17, causes the indexing bar 356 to turn the core 211 in a counterclockwise direction in order to bring the next succeeding tooth spaces in alignment with the clamps 290 and 291. The locating pawls 351 and 352 move into core slots as shown in Fig. 17, in order to prevent accidental rotation of the armature. During movement of the handle 331 from the position shown in Fig. 17 to that shown in Fig. 18, the roller 354 is engaged by the cam 355 so that the locating pawl 352 will be moved out of engagement with the armature core, and the indexing bar 356 is moved so that its projection 357 moves in a clockwise direction around the periphery of a core tooth and is moved by spring 360 into the core slot which succeeds, in direction of rotation of the core, that slot which had previously received the projection 357. It is, therefore, apparent that operation of the handle to manipulate the wire-guiding clamps, which lock the armature core in winding position, also operates mechanism for turning or indexing the core into its successive winding positions.

*Driven winding fixture.*

Figures 19, 20:
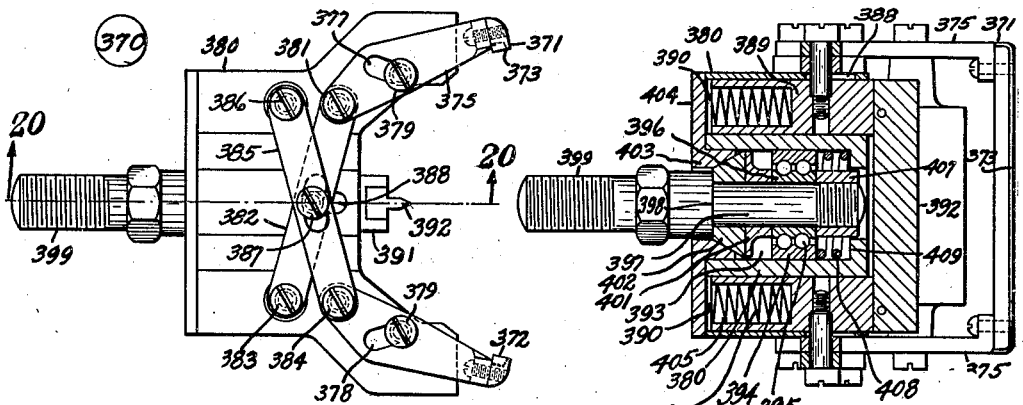
Fig. 19 is a plan view of the driven member of the winding fixture.
Fig. 20 is a sectional view on line 20—20 of Fig. 19.

The driven winding fixture 370 includes clamps 371 and 372 which cooperate with either of the clamps 290 and 291 to provide wire-guiding passages on opposite sides of the armature core. Each of the clamps 371 and 372 are constructed similarly to the clamps 290 and 291, that is, each clamp is provided with a flange 373 adapted to move into a core slot and to surround the edge of the core tooth adjacent the slot into which windings are to be placed. The clamps 371 and 372 are attached to pairs of arms 375 and 376, respectively, provided with elongated openings 377 and 378, respectively, through which pass screws 379 which pivotally support the arms 375 and 376 upon a fixture block 380. Each arm 375 is pivotally connected by screw 381 with a link 382 pivotally connected by screw 383 with block 380. Each arm 376 is pivotally connected by screw 384 with a link 385 which is pivotally connected by a screw 386 with the block 380. Each pair of cross-links 382 and 385 are connected by a screw 387 which passes through slots in said links and through a slot 388 provided by the block 380 and threadedly engages a plunger 389 received by a recess 390 provided by the block 380. The two plungers 389 are connected together by a bar 391 provided with a locating projection 392 which is adapted to be received by and fit snugly into the neck of an armature core slot (see Fig. 22). The block 380 is provided with a central recess 393 for receiving a ball bearing outer race 394 cooperating with ball bearings 395 and a bearing inner race 396. The race 396 is rotatably supported by a rod 397 provided with a shoulder 398 and a threaded portion 399, which is screwed into a slide 400, (see Fig. 1). The rod 397 supports a spacing washer 401 and a conical bearing 402 which is adapted to be received by a companion bearing 403 provided by a plate 404 which is attached to the block 380 and which closes the open ends of the recesses 390 in the block 380. Plungers 389 are each provided with a recess 405 for receiving a spring 406 located between the plunger 389 and the plate 404. The springs 406 tend to urge the plunger 389 to the right, as viewed in Fig. 20. The parts 402, 401 and 396 are retained by a nut 407 threaded on the end of rod 397 for clamping said parts against the shoulder 398. A spring 408 is located within the recess 393 between the bearing race 394 and the wall 409 of the block 380, and tends to maintain the bearing surfaces 402 and 403 yieldingly in engagement.

The slide 400 is supported for horizontal movement by bracket 410 (see Fig. 1), attached to the platform 51 by screws 411. The bracket 410 supports an operating lever 412 having a handle 413. The lever 412 is pivoted at 414 and is attached to an arm 415 connected at 416 with a link 417 pivotally connected with the other end by a screw 418 with a shifting collar 419 which is attached to the slide 400. Movement of the handle 413 to the left, as viewed in Fig. 1, will produce movement of the slide 400 in the same direction and vice versa.

Figure 22:
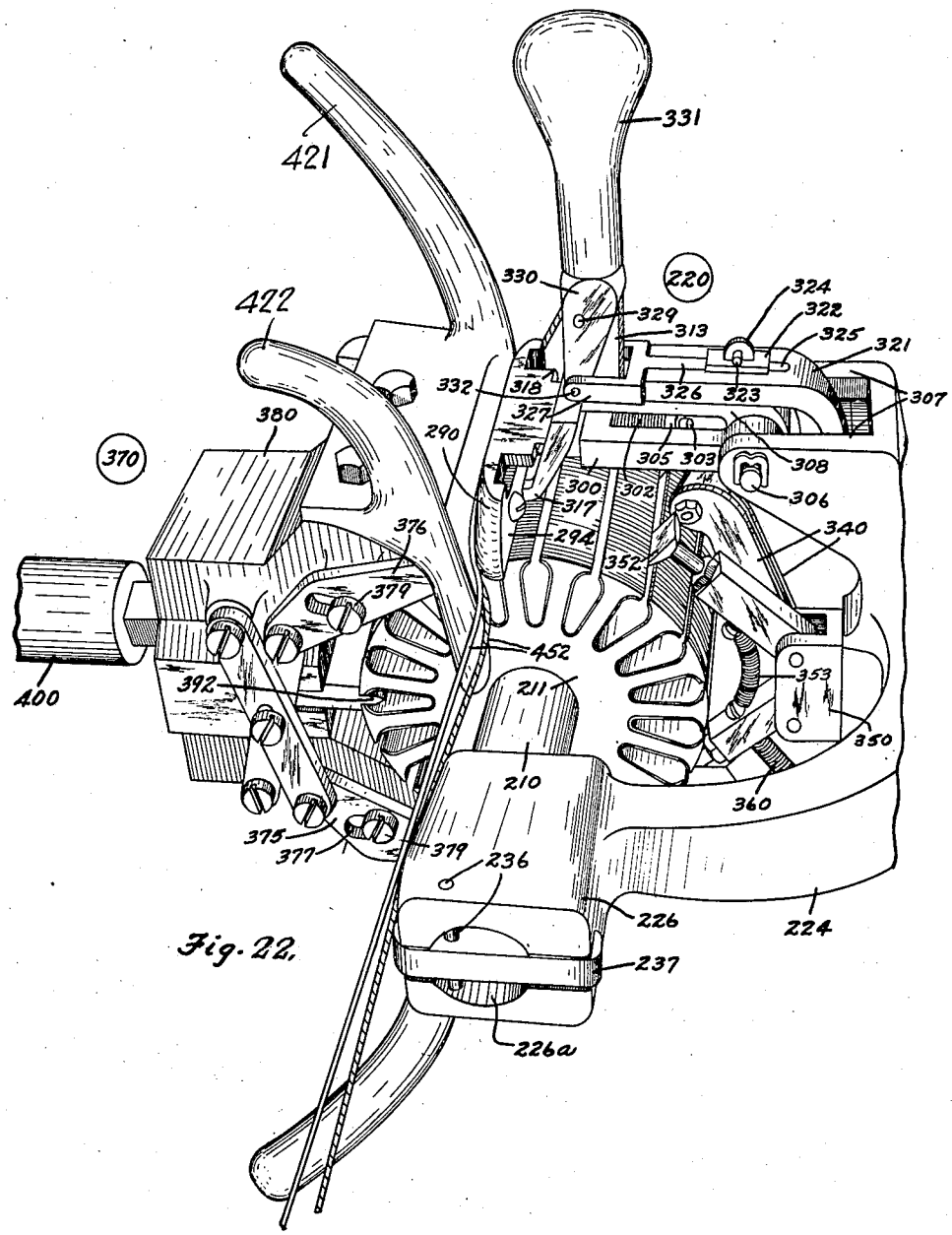
Figs. 22 and 23 are fragmentary perspective views showing the different positions of the winding fixture during the winding of the first turn of wire upon the armature core.
Figure 23:
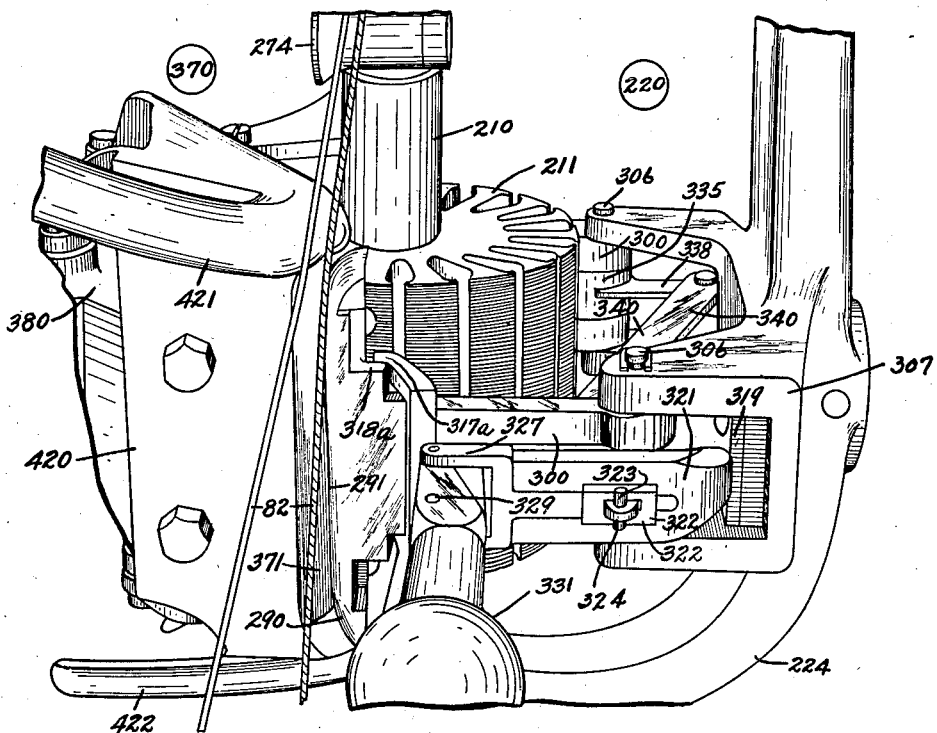

On opposite sides thereof the block 380 carries brackets 420 provided with horns 421 and 422 which, as shown in Figs. 22 and 23, guide the wires 82 into the passages provided by the pairs of clamping wire-guides 290, 371 and 291, 372.

*Mode of operation.*

The first step in using this machine is to mount the armature shaft 210 with a core 211 assembled thereon, upon the winding fixture 220. One end 215 of the shaft is received by the bushing 228 supported by the boss 226 forming a part of the bracket 224. The other end 216 of the shaft 210 is received by the bushing 253 carried by the boss 250 forming a part of the bracket 225. As shown in Fig. 21 the shaft 210 is retained in position by the spring members 261. The handle 331 is pulled toward the operator, who stands adjacent the winding fixture, to bring the clamps 290 and 291 into wire-guiding position, shown in Figs. 17 and 22. This operation causes the armature core 211 to be located so that the neck of one of its core slots 213 will be located in the path of movement of the locating bar 392 of the driven winding fixture 370.

The next operation is to grasp the handle 413 (see Fig. 1), and move it toward the operator in order to move the fixture 370 toward the right as shown in Fig. 1. During this movement the locating member 392 enters into one of the core slots 213 and movement of this member is arrested by engagement of the bar 391 with the core 211. After this occurs, further movement of the lever 413 into the position shown in Fig. 1 will cause the jaws 371 and 372 to move from the position shown in Fig. 21 into the clamping position shown in Figs. 1, 19, 22 and 26 inclusive.

The ends of the wires 82 are wrapped around the hook 272, as shown in Fig. 21. The apparatus is now ready for winding the first coil upon the armature core. The fixtures 220 and 370 are rotated in a counter-clockwise direction as viewed in Fig. 21. Rotation of the fixtures and armature will cause wire to be wound into certain spaced slots of the core and across the ends of the core, the wires 82 being guided by the horns 421 and 422 carried by the fixture 370 and by the pairs of wire-guiding clamps 291, 371 and 290, 372. After a predetermined number of revolutions of the winding fixtures 220 and 370, the rotation of the shaft 90 will automatically stop and the fixtures will come to rest approximately in the position shown in Fig. 24.

Figure 24:
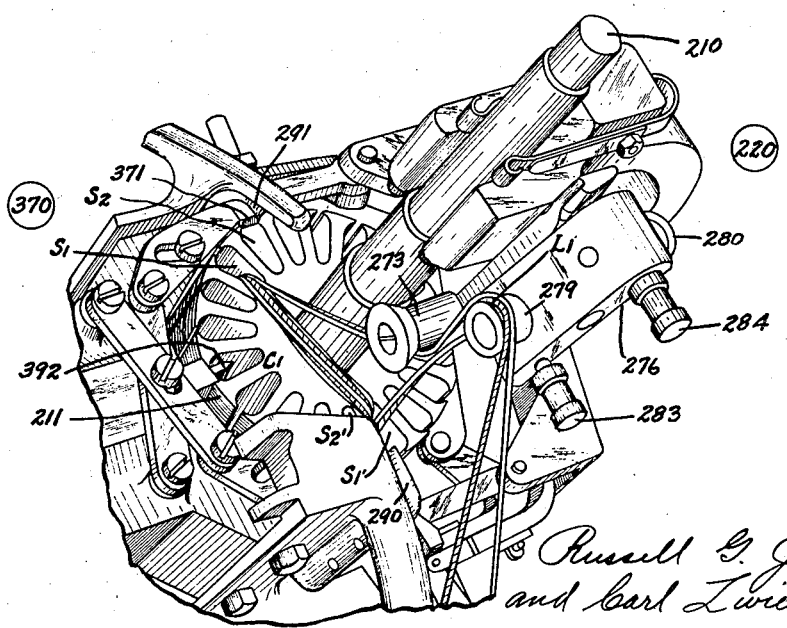
Fig. 24 is a fragmentary view of the apparatus after the first coil has been wound.

Before winding the second coil upon the armature core 211, the fixtures 370 and 220 are moved into the position shown in Fig. 21 by manipulation of the handles 413 and 331, respectively. Then the fixture 220 is first returned to the position shown in Fig. 1 by pulling the handle 331 toward the operator. This operation of the handle 331 will cause the core 211 to be automatically indexed or turned into a new winding position. Then the handle 413 is pulled toward the operator to move the fixture 370 again into the position shown in Fig. 1. As shown in Fig. 24, one of the clamps 371 provided by the fixture 370 has entered into the core slot $S_2$ adjacent the slot $S_1$ into which the first armature coil has been wound, and a wire-guiding clamp 291 carried by the fixture 220 has also entered the slot $S_2$. The ends of the wires 82 are removed from the hook 272 and are placed beneath the loop-forming bracket 276. The wires connecting the first armature coil with the supply wheels are placed around the pulleys 273 and 279, as shown in Fig. 24.

Figure 25:
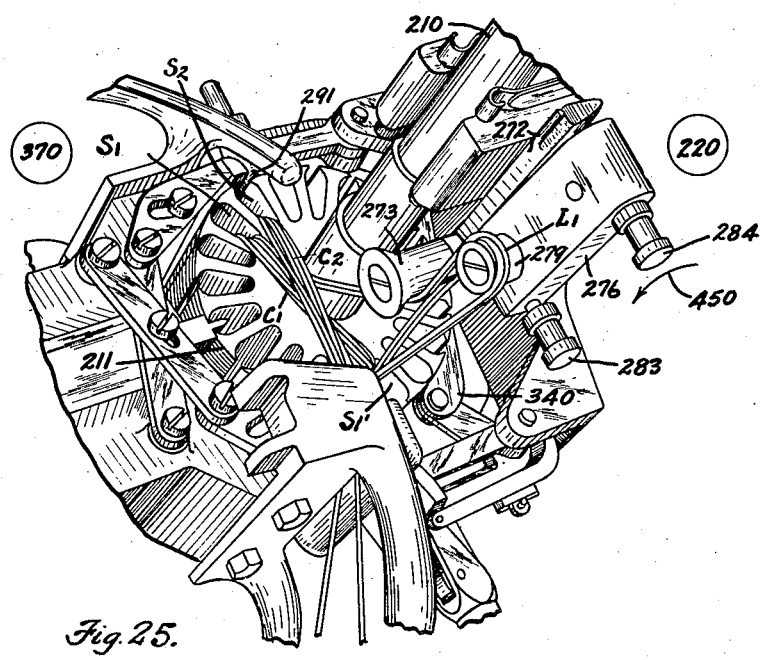
Fig. 25 is a view similar to Fig. 24 showing the apparatus after completing the winding of the second coil.

The apparatus is now ready for winding the second armature coil. The lever 140 is again pushed toward the machine and released after the winding fixtures begin rotating. After a predetermined number of revolutions the fixtures will stop and will return substantially to the position shown in Fig. 25, which shows the first and second armature coils designated in Fig. 25, by $C_1$ and $C_2$. The end leads of the two wires forming coil $C_1$ are connected with the start leads of the two wires forming coil $C_2$ by two wire loops designated by $L_1$ in Fig. 25.

Figure 26:
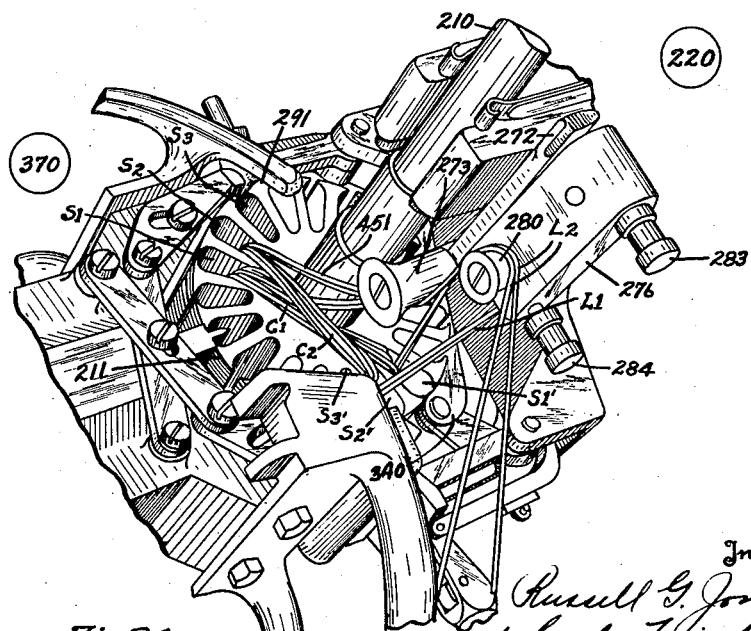
Fig. 26 is a view similar to Fig. 25 showing the apparatus just preparatory to the winding of the third coil.

Before beginning to wind the third coil upon the armature core, the fixture-operating handles 413 and 331 are manipulated as before in order to bring the core 211 into the third position for winding. Fig. 26 shows the guide clamps 371 and 291 entering the slot $S_3$. Obviously the opposite wire-guiding clamps will have entered the opposite slot $S_3'$. In order to move the loop $L_1$ out of the way to make room for the formation of a second loop $L_2$ for connecting the second and third coils, the operator will pull out the knob 284 to withdraw the plunger end 287 from the recess 288 in the bracket 270. This operation will permit the bracket 276 to be rotated. Bracket 276 is rotated from the position shown in Fig. 25 to that shown in Fig. 26, in a counterclockwise direction indicated by the arrow 450 in Fig. 25. This will move the plunger-operating knob 284 from the position shown in Fig. 25 to a lower position shown in Fig 26, while the plunger knob 283 moves to the lower position shown in Fig. 25 to the upper position shown in Fig. 26. This operation causes the pulleys 279 and 280 to exchange positions so that, instead of being in the lower position as shown in Fig. 24, pulley 279 will be in the upper position, while the pulley 280 has been moved into the lower position, as shown in Fig. 26. This operation causes loop $L_1$ to be moved to the right of the shaft 210 and under the bracket 276. The same operation allows the loop to be released from its supporting pulley 279. The end leads, designated by numeral 451 in Fig. 26, of the coils $C_2$ are located around the pulley 273 and are pulley 280, so that this portion of the wires will form two loops of wire designating $L_2$ in Fig. 26 for connecting the end leads of the coil $C_2$ with the start leads or bottom turns of the third coil.

The machine is operated in this manner until the desired number of coils have been wound upon the armature core. After the winding has been completed the wires 82 are severed from the last coil wound, and the ends of wires 82 are wrapped around the hook as shown in Fig. 21. Then the handle 413 is moved away from the operator in order to retract the two clamps 371 and 372 from the core and the entire fixture 370 from the core. The handle 331 is moved to retract the clamps 290 and 291, as shown in Fig. 21. Then the armature may be readily removed from the fixture 220.

One important feature is that of guiding the wires into the core slots in such a manner that the insulation of the wires will not be damaged, and also so that the wires will be placed in the core slots most advantageously so that each slot will receive the maximum number of conductors. In order to prevent damage to the insulation of the wires, the wire-guiding clamps are constructed so that the edges thereof may enter into the necks of the core slots into which the windings are to be placed. The exterior wire-guiding surfaces of these clamps are made very smooth so as not to injure the insulation wrapping. As shown more clearly in Figs. 22 and 23, the wire-guiding horns 421 and 422 carried by the fixture 370 are shaped so that the wires will be cammed toward that side of the core slot which is more remote from the fixture 370. This camming action of the horns is clearly shown in Fig. 22 at the portion of the wires connected by numeral 452. Consequently, when the wires snap off the ends of the horns in going into the ends of the slots, these wires will tend to fall into the bottom of the slots or the portion of the slot nearest to the center of the core rather than to cling to the side of the slots and occupy portions thereof which are more remote from the core. In other words, the action of the horns is such as to cause the wires to be placed down as near as possible to the bottom of the core slot so as to provide space sufficient for the succeeding turns of wire.

Other advantages of the present invention are to be found in rapidity of manipulation. In order to index the core for winding wire upon it and for bringing the wire-guiding clamps into position, the operator has but to manipulate two handles, namely, handle 413 of the fixture 370 and handle 331 of the fixture 220. For moving the loop-forming bracket 276 into various positions, the operator merely pulls out one of the handles 283 or 284 (whichever may be in the upper position) and moves it to the lower position, thereby rotating the bracket 180°. The upper plunger will automatically snap into the recess 288 provided by the bracket 270, thereby maintaining the bracket 276 in correct position.

While the form of embodiment of the invention as herein disclosed, constitutes a preferred form, it is to be understood that other forms might be adopted, all coming within the scope of the claims which follow:

What is claimed is as follows:

1. A winding fixture for an armature winding machine comprising the combination of a frame adapted to be rotatably supported by a rotary member of the machine, means carried entirely by said frame for rotatably supporting an armature core with its axis transverse to the axis of rotation of the frame, and means movably supported by the frame and movable into engagement with the core for clamping the same in the desired winding position and retractable from the core to permit turning the core upon the frame into different winding positions while the core is supported by the frame.

2. A winding fixture for an armature winding machine comprising the combination of a frame adapted to be rotatably supported by a rotary member of the machine, means carried entirely by said frame for rotatably supporting an armature core with its axis transverse to the axis of rotation of the frame, means movably supported by the frame and movable into engagement with the core for clamping the same in the desired winding position and retractable from the core to permit turning the core upon the frame into different winding positions while the core is supported by the frame, and manually operable means carried by the frame for turning the core the required distance into the next winding position.

3. A winding fixture for an armature winding machine comprising the combination of a frame adapted to be rotatably supported by a rotary member of the machine, means carried entirely by said frame for rotatably supporting an armature core with its axis transverse to the axis of rotation of the frame, clamps movably supported by said frame and including wire guiding members having portions adapted to enter laterally into the core slots and to cover longitudinal edges of adjacent core teeth; and manually operable means carried by the frame for moving the clamps toward or away from the core.

4. A winding fixture for an armature winding machine comprising the combination of a frame adapted to be rotatably supported by a rotary member of the machine, means carried entirely by said frame for rotatably supporting an armature core with its axis transverse to the axis of rotation of the frame, wire guides supported by the frame and movable into engagement with the periphery of the core and locatable adjacent certain core slots, means carried by the frame for retaining said guides in wire guiding position, and means carried by the frame for operating the wire guide retaining means and for moving the wire guides relative to the core.

5. A winding fixture for an armature winding machine comprising the combination of a frame adapted to be rotatably supported by a rotary member of the machine, means carried entirely by said frame for rotatably supporting an armature core with its axis transverse to the axis of rotation of the frame, wire guides supported by the frame and movable into engagement with the periphery of the core and locatable adjacent certain core slots, and manually operable means carried by the frame including a single operating member for moving the wire guides simultaneously.

6. A winding fixture for an armature winding machine comprising the combination of a frame adapted to be rotatably supported by a rotary member of the machine, means carried entirely by said frame for rotatably supporting an armature core with its axis transverse to the axis of rotation of the frame, wire guides supported by the frame and movable into engagement with the periphery of the core and locatable adjacent certain core slots, and means carried by the frame for turning the core the required distance into the next winding position.

7. A winding fixture for an armature winding machine comprising the combination of a frame adapted to be rotatably supported by a rotary member of the machine, means carried entirely by said frame for rotatably supporting an armature core with its axis transverse to the axis of rotation of the frame, wire guides supported by the frame and movable into engagement with the periphery of the core and locatable adjacent certain core slots, and means carried by the frame for operating the wire guides and for turning the core the required distance into the next winding position.

8. A winding fixture for an armature winding machine comprising the combination of a frame adapted to be rotatably supported by a rotary member of the machine and having means for supporting an armature core with its axis transverse to the axis of rotation of the frame; wire guiding members carried by the frame and locatable adjacent certain core slots; means for latching the guiding members in operating position; means for controlling the latch and for moving the guiding members; and means operated by the last named means for turning the core the required distance into the next winding position.

9. A winding fixture for an armature winding machine comprising the combination of a frame adapted to be rotatably supported by a rotary member of the machine and having means for supporting an armature core with its axis transverse to the axis of rotation of the frame; wire guiding members carried by the frame and locatable adjacent certain core slots; and means for moving both guiding members toward the core and for concurrently turning the core the required distance into the next winding position.

10. A winding fixture for an armature winding machine comprising the combination of a frame adapted to be rotatably supported by a rotary member of the machine and having means for supporting an armature core with its axis transverse to the axis of rotation of the frame; wire guiding members carried by the frame and locatable adjacent certain core slots; means for latching the guides in operating position and including a movable latching member; and means including a member movable in one direction for moving the guides into operating position and the latching member into latching position, and vice versa.

11. An armature winding machine comprising, in combination, a rotatable winding fixture for receiving an armature core and turning it about an axis transverse to the axis of the core; and a fixture rotatable about an axis in alignment with the first mentioned fixture and movable axially into engagement with the core and having wire guides movable adjacent to the core automatically in response to the movement of the fixture toward the core.

12. An armature winding machine comprising, in combination, a rotatable winding fixture for receiving an armature core and turning it about an axis transverse to the axis of the core; a fixture including a body member rotatable about an axis in alignment with the first mentioned fixture and movable axially toward the core; a locating part carried by the body and movable relative thereto and adapted to engage the core and to be inserted in a core slot; wire guides carried by the body; and means responsive to the movement of the body toward the core after motion of the locating part has been arrested by the core for causing the wire guides to move adjacent to the core.

13. A winding fixture for an armature winding machine comprising the combination of a frame for supporting a core to be wound; and a loop forming device carried by the frame including a pivoted block having wire engaging members on opposite sides of the block and on opposite sides of the pivot of the block.

14. A winding fixture for an armature winding machine comprising the combination of a frame adapted to be rotatably supported by a rotary member of the machine and having means for supporting an armature core with its axis transverse to the axis of rotation of the frame; and a loop forming device carried by the frame adjacent one end of the core and including a block pivoted upon an axis transverse to the axis of the core and having wire loop forming members on opposite sides of the block and on opposite sides of the pivot of the block.

15. An armature winding machine comprising, in combination, a rotatable member; a fixture attached to the spindle and having means for supporting an armature core with its axis transverse to the axis of the rotatable member; a second fixture mounted coaxially of the first fixture; a pair of wire guiding members supported by the first fixture and movable into engagement with certain spaced core teeth; and a second pair of wire guiding members supported by the second fixture and movable respectively into engagement with the core teeth adjacent those core teeth engaged by the first-mentioned pair of wire guiding members and spaced therefrom.

16. A machine such as defined by claim 15, each of the wire guiding members having a thin flange which encloses the edge of a core tooth adjacent the slot into which a wire is guided by the member.

17. A rotatable winding fixture for an armature winding machine comprising the combination of means for supporting an armature core with its axis transverse to the axis of rotation of the fixture, wire guides movable into engagement with the periphery of the core and locatable adjacent certain core slots, means for indexing the core angularly into successive winding positions, and a single manually operable member for moving the wire guides and for operating the core-indexing-means.

18. A rotatable winding fixture for an armature winding machine comprising the combination of means for supporting an armature core with its axis transverse to the axis of rotation of the fixture, wire guides movable into engagement with the periphery of the core and locatable adjacent certain core slots, means for latching the wire guides in operating position, means for controlling the latching means and for moving the wire guides, said controlling means including a manually operable member mounted for movement in paths which are transverse to each other, movement of the member in one path moving the latch and movement of the member in the other path moving the wire guides.

19. A rotatable winding fixture for an armature winding machine comprising the combination of means for supporting an armature core with its axis transverse to the axis of rotation of the fixture, wire guides movable into engagement with the periphery of the core and locatable adjacent certain core slots, means for indexing the core angularly into successive winding positions, means for latching the wire guides in operating position, means for controlling the latching means and for moving the wire guides and for operating the indexing means, said controlling means including a manually operable member mounted for movement in paths which are transverse to each other, movement of the member in one path moving the latch and movement of the member in the other path moving the wire guides and core-indexing-means.

20. A rotatable winding fixture for an armature winding machine comprising the combination of means for supporting an armature core with its axis transverse to the axis of rotation of the fixture, wire guides movable into engagement with the periphery of the core and locatable adjacent certain core slots, means for latching the wire guides in operating position, and means including a single manually operable member for moving the latching means and for moving the wire guides.

21. A rotatable winding fixture for an armature winding machine comprising the combination of means for supporting an armature core with its axis transverse to the axis of rotation of the fixture, a locating part movable into a core slot, wire guides movable into engagement with the periphery of the core and locatable adjacent certain other core slots, and means operated by a single member for moving the locating part into a core slot and for moving the wire guides against the core.

In testimony whereof we hereto affix our signatures.

RUSSELL G. JONES
CARL ZWIEBEL.